United States Patent
Lee

(10) Patent No.: US 10,571,995 B1
(45) Date of Patent: Feb. 25, 2020

(54) POWER-SAVING SCANNING METHOD FOR TOUCH DEVICE

(71) Applicant: Advanced Analog Technology, Inc., Zhubei, Hsinchu County (TW)

(72) Inventor: Kun-Hsu Lee, Zhubei (TW)

(73) Assignee: ADVANCED ANALOG TECHNOLOGY, INC., Zhubei, Hsinchu County (TW)

( * ) Notice: Subject to any disclaimer, the term of this patent is extended or adjusted under 35 U.S.C. 154(b) by 0 days.

(21) Appl. No.: 16/242,585

(22) Filed: Jan. 8, 2019

(30) Foreign Application Priority Data

Oct. 12, 2018 (TW) .............................. 107136044 A

(51) Int. Cl.
*G06F 1/3234* (2019.01)
*G06F 3/044* (2006.01)
*G06F 3/041* (2006.01)

(52) U.S. Cl.
CPC ............ *G06F 1/3262* (2013.01); *G06F 3/044* (2013.01); *G06F 3/0416* (2013.01)

(58) Field of Classification Search
CPC . G06F 2203/04106; G06F 2203/04104; G06F 1/3262; G06F 1/3287; G06F 1/3203
See application file for complete search history.

(56) References Cited

U.S. PATENT DOCUMENTS

| 2009/0251427 | A1* | 10/2009 | Hung | G06F 1/3262 |
| | | | | 345/173 |
| 2009/0289908 | A1* | 11/2009 | Chen | G06F 1/3203 |
| | | | | 345/173 |
| 2019/0095006 | A1* | 3/2019 | Shahparnia | G06F 3/0416 |

\* cited by examiner

*Primary Examiner* — Gerald Johnson
(74) *Attorney, Agent, or Firm* — Muncy, Geissler, Olds & Lowe, PC

(57) ABSTRACT

A power-saving scanning method for a touch device is provided. Firstly, a controller is used to shorten a normal scanning time of a timer into a power-saving scanning time. Then, a counter is used to count the oscillating waveform within the power-saving scanning time to access a power-saving oscillating number. Afterward, the controller is used to convert the power-saving oscillating number into an (L-n)-digit M-bit count value, shift the (L-n)-digit M-bit count value toward the higher digit by n digits, and pad the lower digits with n zeros to form another L-digit M-bit count value so as to generate an M-bit oscillating number simulation value for the determination of touch operation.

8 Claims, 5 Drawing Sheets

US 10,571,995 B1

POWER-SAVING SCANNING METHOD FOR TOUCH DEVICE

This application claims the benefit of Taiwan Patent Application Serial No. 107136044, filed on Oct. 12, 2018, the subject matter of which is incorporated herein by reference.

BACKGROUND OF INVENTION

1. Field of the Invention

The present invention is related to a power-saving scanning method for a touch device, and more particularly is related to a power-saving scanning method for a touch device by padding lower digits with zero to generate a simulation value.

2. Description of the Prior Art

In present, various electronic devices invades and occupies our daily lives. Attending with the development of technologies, capacitive touch keys have become a main stream for the user interfaces of these electronic devices. The operation theory of the capacitive touch key is to charge/discharge a capacitor by using a relaxation oscillator and calculate scanning time and oscillating number by using a timer and a counter, such that when the capacitive touch keypad is pressed, the scanning time or the oscillating number would be changed due to the parallel connection of the sensing capacitor and the parasitic capacitor of the user. Such a change can be regarded as an indication that the capacitive touch key is pressed.

As mentioned, in practical usage, the capacitive touch key on the electronic apparatus is charged and discharged continuously, and the oscillating number or the scanning time is detected by using a periodical scanning process. Thus, even if the electronic apparatus is under the standby condition, the electronic apparatus still consumes power waiting for the possible touch operation. The power consumption becomes significant as time passes.

Please refer to FIG. 1, which is a diagram showing the scanning period of the conventional capacitive touch key. As shown, under the normal scanning period, each scanning period T has a scanning time st1, and the scanning period is extended for reducing power consumption. For example, for a double scanning period, the original scanning time st1 is kept but the scanning period T is increased to the scanning period T2; for a fourth times scanning period, the original scanning time st1 is kept but the scanning period T is increased to the scanning period T3. The method of extending scanning period is helpful for reducing overall scanning time st1, but the touch sensitivity is also reduced.

SUMMARY OF THE INVENTION

The conventional technology reduces standby power consumption for the touch device by extending scanning period to reduce overall scanning time. However, such technology may also cause the reduction of touch sensitivity. Accordingly, it is an object of the present invention to provide a power-saving scanning method for the touch device which not only reduces the power consumption efficiently but also keeps the touch sensitivity.

In order to achieve the aforementioned object, a power-saving scanning method for a touch device is provided. The power-saving scanning method is adapted when the touch device is switched from a normal scanning mode to a power-saving scanning mode, wherein the touch device includes a touch module, a waveform generation module, a counter, a timer, and a controller, the waveform generation module is utilized for detecting the touch module to generate an oscillating waveform, the counter counts an oscillating number of the oscillating waveform within a normal scanning time t1 under the normal scanning mode to access a normal oscillating number, and the controller converts the normal oscillating number into an L-digit M-bit count value to be stored, wherein $M/2 \leq L \leq M$ and $M \leq 8$.

The power-saving scanning method comprises the steps as below. Firstly, the controller is used to shorten the normal scanning time t1 to a power-saving scanning time t2, wherein $t2=t1/2^n$, n is an integer, and $n \geq 1$.

Then, the counter is used to calculate the oscillating number of the oscillating waveform within the power-saving scanning time t2 to access a power-saving oscillating number.

Afterward, the controller is used to convert the power-saving oscillating number into an (L-n)-digit M-bit count value, shift the (L-n)-digit M-bit count value toward a higher digit by n digits, and pad lower digits thereof with n zeros to form another L-digit M-bit count value for generating an M-bit oscillating number simulation value, wherein $n \leq M/4$.

In accordance with an embodiment of the present invention, the controller is preset with an oscillating number reference value, wherein 97% of the oscillating number reference value is a mode switching threshold value.

In accordance with an embodiment of the present invention, the controller is also used at last to determine whether the M-bit oscillating number simulation value is higher than the mode switching threshold value, and to switch the touch device to the normal scanning mode when the M-bit oscillating number simulation value is lower than the mode switching threshold value.

In accordance with an embodiment of the present invention, the waveform generation module is a relaxation oscillator.

In order to achieve the aforementioned object, another power-saving scanning method for a touch device is also provided. The power-saving scanning method for a touch device is adapted when the touch device is switched from a normal scanning mode to a power-saving scanning mode, wherein the touch device includes a touch module, a waveform generation module, a counter, a timer, and a controller, the waveform generation module is utilized for detecting the touch module to generate an oscillating waveform, the timer calculates a normal scanning time needed for the oscillating waveform to reach a normal oscillating number p1 under the normal scanning mode, and the controller converts the normal scanning time into an L-digit M-bit count value to be stored, wherein $M/2 \leq L \leq M$ and $M \geq 8$.

The power-saving scanning method comprises the steps as below. Firstly, the controller is used to shorten the normal oscillating number p1 of the counter to a power-saving oscillating number p2, wherein $p2=p1/2^n$, n is an integer, and $n \geq 1$.

Then, the timer is used to calculate the time needed for the oscillating waveform generated by the waveform generation module to reach the power-saving oscillating number p2 to access a power-saving scanning time.

Afterward, the controller is used to convert the power-saving scanning time into an (L-n)-digit M-bit count value, shift the (L-n)-digit M-bit count value toward a higher digit by n digits, and pad lower digits thereof with n zeros to form another L-digit M-bit count value for generating an M-bit scanning time simulation value, wherein n≤M/4.

In accordance with an embodiment of the present invention, the controller is preset with a scanning time reference value, wherein 103% of the scanning time reference value is a mode switching threshold value.

In accordance with an embodiment of the present invention, the controller is used to determine whether the M-bit scanning time simulation value is higher than the mode switching threshold value, and to switch the touch device to the normal scanning mode when the M-bit scanning time simulation value is higher than the mode switching threshold value.

In accordance with an embodiment of the present invention, the waveform generation module is a relaxation oscillator.

As mentioned above, the present invention reduces power consumption by reducing the scanning time or the oscillating number and uses the method of padding lower bits with zeros after the scanning time or the oscillating number is converted into a bit value so as to generate the scanning time or the oscillating number similar to that in the normal scanning mode. Thereby, the power consumption can be effectively reduced, and the touch sensitivity can be kept.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
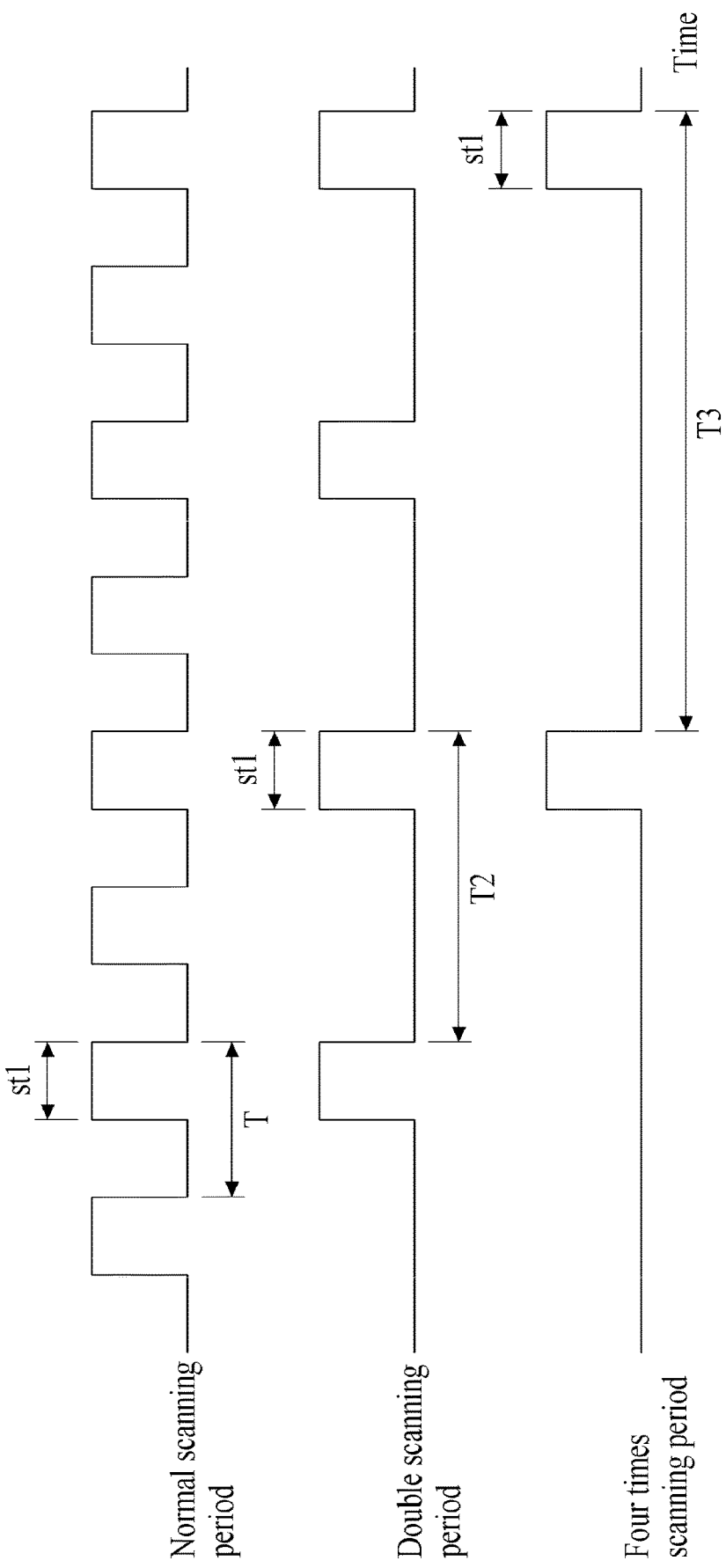
FIG. 1 is a diagram showing a scanning period of a conventional capacitive touch key.

The specific structural and functional details disclosed herein are only representative and are intended for describing exemplary embodiments of the disclosure. It is noted that, in the disclosure, similar elements would be represented by the same labels. Moreover, the drawings are for the purpose of illustration. The drawings may not be drawn based on precise proportions, and the drawing may not contain all the details.

Figure 2:
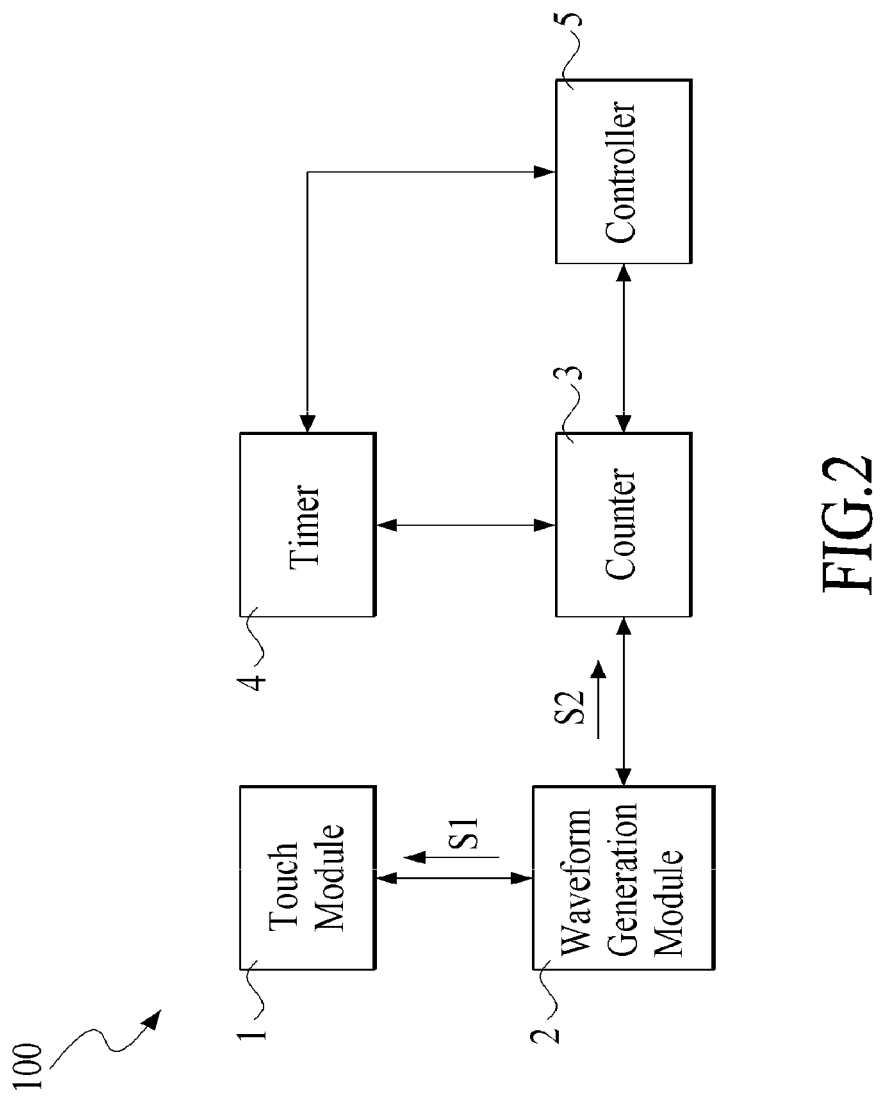
FIG. 2 is a schematic view showing the electronic system of the touch device provided in accordance with a first preferred embodiment of the present invention.

FIG. 2 is a schematic view showing the electronic system of the touch device provided in accordance with a first preferred embodiment of the present invention. As shown, the touch device 100 includes a touch module 1, a waveform generation module 2, a counter 3, a timer 4, and a controller 5.

The touch module 1 is utilized for charging and discharging the capacitor to generate and transmit an oscillating signal S1. In the present embodiment, the touch module 1 is a relaxation oscillator. The waveform generation module 2 is electrically connected to the touch module 1 for receiving the oscillating signal S1, analyzing the oscillating signal S1 to generate an oscillating waveform, and transmitting a waveform signal S2 carrying the oscillating waveform The counter 3 is electrically connected to the waveform generation module 2 for counting the oscillating number of the oscillating waveform carried by the waveform signal S2. The timer 4 is electrically connected to the counter 3 for calculating the time the counter 3 counting the oscillating number of the oscillating waveform.

The controller 5 is electrically connected to the counter 3 and the timer 4 for controlling the counter 3 to count the oscillating number in every scanning time based on a scanning period and comparing the counted oscillating number or the scanning time to the predetermined number or time to determine whether the touch module 1 is pressed. The controller 5 is set with a normal scanning mode and a power-saving scanning mode. As the controller 5 is operated under the normal scanning mode, the scanning time of the timer 4 is set as a normal scanning time t1, the counter 3 counts the oscillating number of the oscillating waveform within the normal scanning time t1 as a normal oscillating number, and the controller 5 converts the normal oscillating number into an L-digit M-bit count value to be stored.

As mentioned above, the controller 5 is preset with an oscillating number reference value. The oscillating number reference value indicates the oscillating number accessed by counting the oscillating waveform by the counter 3 within the normal scanning time t1 under the normal scanning mode when the touch module 1 is not touched by the user. In the present embodiment, the oscillating number reference value is 4000 for example, and an effective touch is determined when the oscillating number is lower than 94% of the oscillating number reference value, i.e. 4000×94%=3760. In addition, in the present embodiment, the default mode for the controller 5 is the power-saving scanning mode, the controller 5 enters the normal scanning mode when the oscillating number is lower than 97% of the oscillating number reference value, i.e. 4000×97%=3880, and is shifted back to the power-saving scanning mode when the oscillating number is higher than 97% of the oscillating number reference value, i.e. 3880.

For example, under the normal scanning mode, as the oscillating number detected by the counter 3 within the normal scanning time t1 (e.g. 1 ms) is 4000 and the M-bit count value is a 16-bit count value. When the number 4000 is stored in 16 bits, the bit value of 0000 1111 1010 0000 would be generated, and the aforementioned L-digit value is a 12-digit value.

Figure 3:
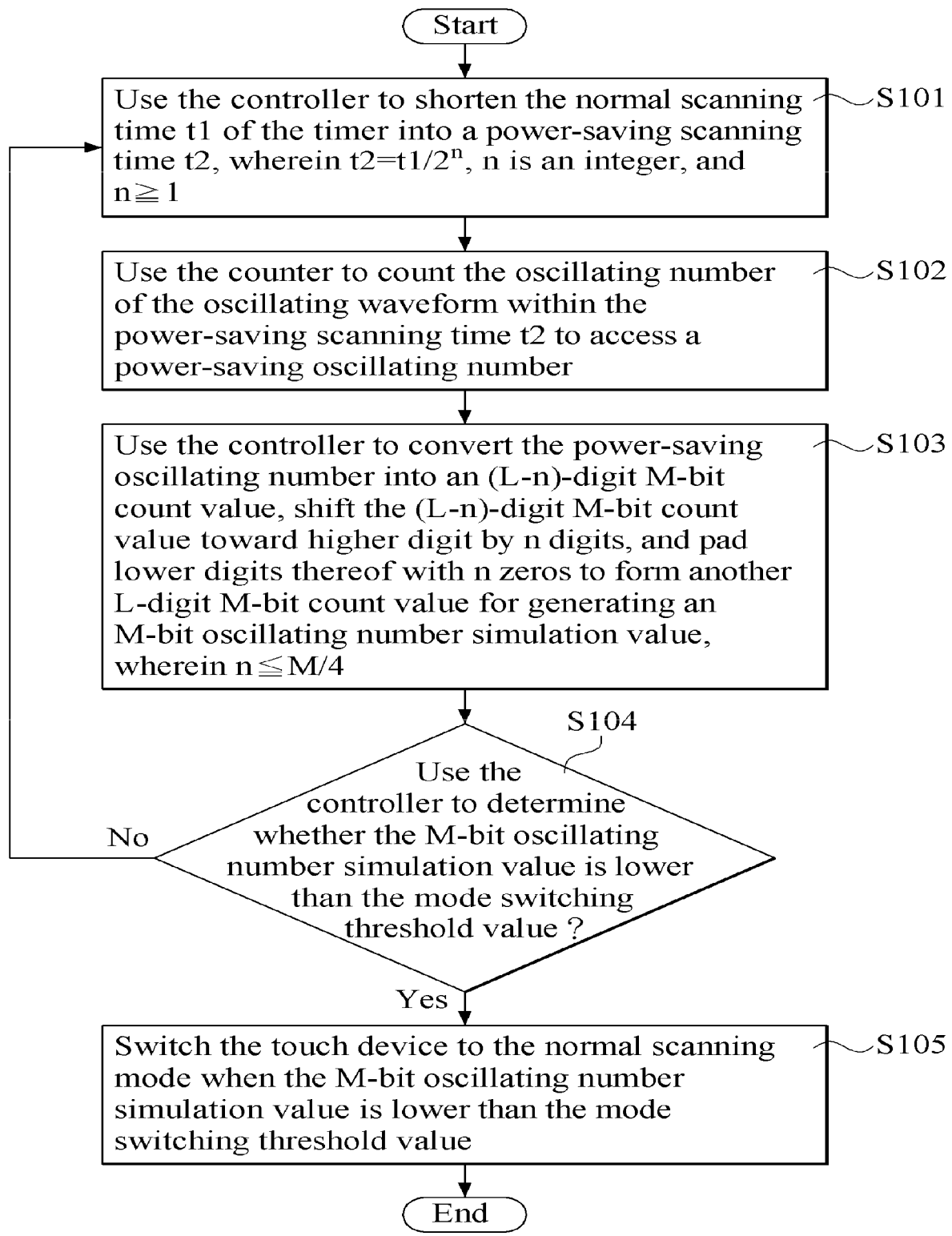
FIG. 3 is a flow chart showing a power-saving scanning method for the touch device in accordance with a first preferred embodiment of the present invention.

Please keep referring to FIG. 3, which is a flow chart showing a power-saving scanning method for the touch device in accordance with a first preferred embodiment of the present invention. As shown, firstly, step S101 of the power-saving scanning method for the touch device provided in the present invention is carried out to use the controller 5 to shorten the normal scanning time t1 of the timer 4 into a power-saving scanning time t2, wherein $t2=t1/2^n$, n is an integer, and n≥1. In the present embodiment, n is 1 for example, i.e. t2=t1/2.

Thereafter, step S102 is carried out to use the counter 3 to count the oscillating number of the oscillating waveform within the power-saving scanning time t2 to access a power-saving oscillating number. In the present embodiment, the power-saving oscillating number is 2000 for example.

Then, step S103 is carried out to use the controller 5 to convert the power-saving oscillating number into an (L-n)-digit M-bit count value, shift the (L-n)-digit M-bit count value toward the higher digit by n digits, and pad the lower digits thereof with n zeros to form another L-digit M-bit count value for generating an M-bit oscillating number simulation value, wherein n≤M/4.

In the present embodiment, as n=1, i.e. the power-saving scanning time t2 is half the normal scanning time t1, if the detected power-saving oscillating number is 1900, the number 1900 would be converted into an M-bit count value (M=16 for example) of 0000 0111 0110 1100, which is a 11-digit value. Thus, when the (L-n)-digit M-bit count value is shifted toward the higher digit by n digits and the lower digits thereof are padded with n zeros, another L-digit M-bit count value of 0000 1110 1101 1000 would be generated, and the M-bit oscillating number simulation value generated from the M-bit count value of 0000 1110 1101 1000 is 3800.

Afterward, step S104 is carried out to use the controller 5 to determine whether the M-bit oscillating number simulation value is lower than the mode switching threshold value. Then, when the M-bit oscillating number simulation value is lower than the mode switching threshold value, step S105 is carried out to switch the touch device to the normal scanning mode. In the present embodiment, the M-bit oscillating number simulation value is 3800, which is lower than the mode switching threshold value, i.e. 3880, and thus the controller 5 would enter the normal scanning mode. After entering the normal scanning mode, an effective touch would be determined if the normal oscillating number counted by the counter 3 is lower than 3760. In addition, as the normal oscillating number is higher than the mode switching threshold value, i.e. 3880, the controller 5 would be switched back to the power-saving scanning mode.

Figure 4:
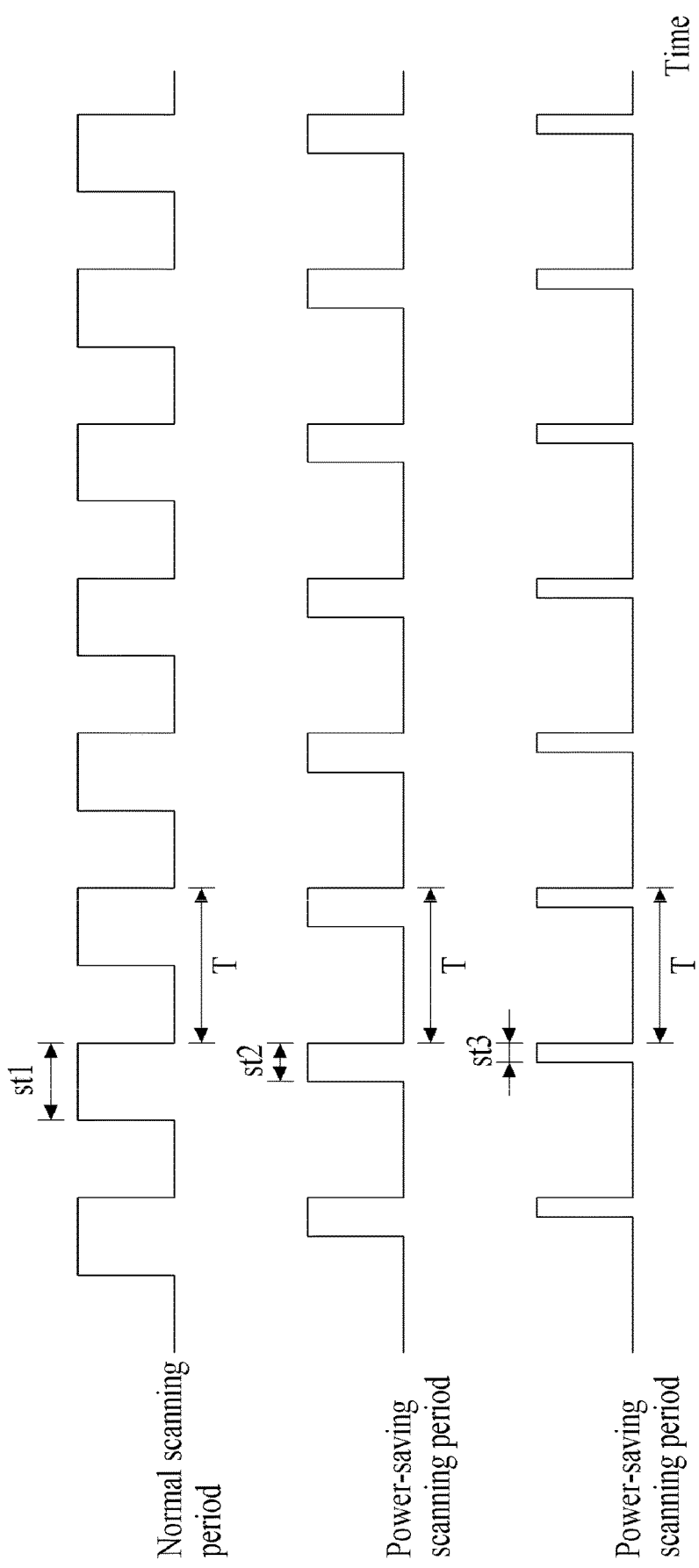
FIG. 4 is a schematic view showing the comparison of the normal scanning period and the power-saving scanning period provided in accordance with a first preferred embodiment of the present invention.

Please keep referring to FIG. 4, which is a schematic view showing the comparison of the normal scanning period and the power-saving scanning period provided in accordance with a first preferred embodiment of the present invention. As shown, the present invention uses the controller 5 to control the counter 3 using the same scanning period T for scanning the oscillating number in both the normal scanning period of the normal scanning mode and the power-saving scanning period of the power-saving scanning mode. However, under the power-saving scanning mode, the scanning time st2 and st3 is ½ and ¼ of the scanning time st1 respectively, wherein the scanning time st1 is the normal scanning time t1, the scanning time st2 is the power-saving scanning time t2 when n=1, the scanning time st3 is the power-saving scanning time t3 when n=2.

As mentioned, it is understood that the present embodiment uses the controller 5 to shorten the normal scanning time t1 into the power-saving scanning time t2 to reduce power consumption effectively, to convert the detected power-saving oscillating number into an M-bit count value, and then to do the calculation of shifting the M-bit count value to the higher digit and padding the lower digits with zeros to have the M-bit oscillating number simulation value similar to the normal oscillating number detected under the normal scanning mode. Thereby, the present invention is capable to reduce power consumption effectively and keep the accuracy of touch determination without the need to change the setting for the original oscillating number reference value and the determination of effective touch so as to make the usage more convenient.

Figure 5:
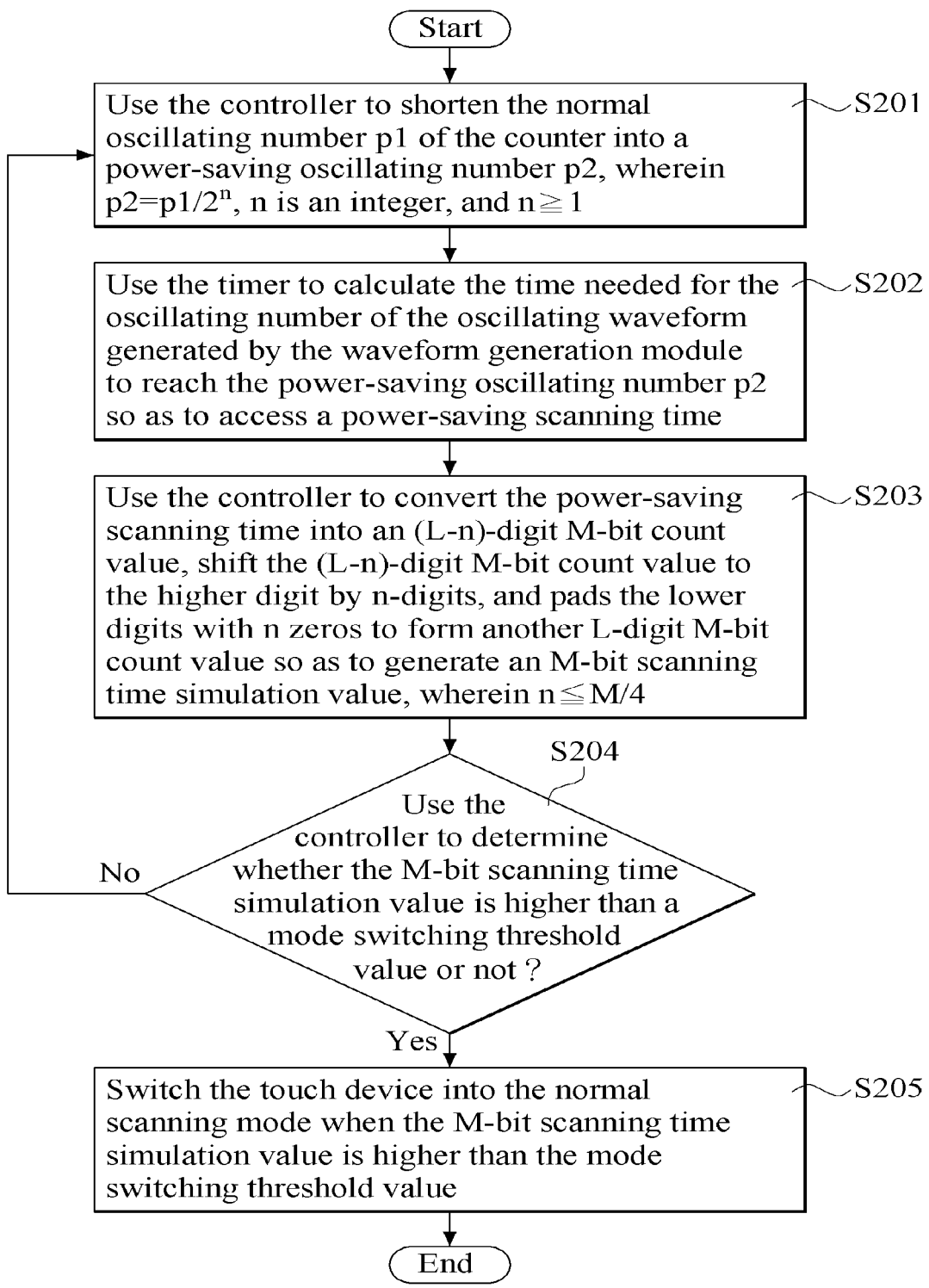
FIG. 5 is a flow chart showing a power-saving scanning method for the touch device in accordance with a second preferred embodiment of the present invention.

Please keep referring to FIG. 5, which is a flow chart showing a power-saving scanning method for the touch device in accordance with a second preferred embodiment of the present invention. As shown, because the touch control determination mechanism for the capacitive touch key includes the mechanism of detecting the needed scanning time for a given oscillating time in addition to the mechanism of detecting the oscillating number within a given scanning time. Thus, in the present invention, a power-saving scanning method is provided based on the same fundamental circuitry architecture and the same touch device 100, but uses the controller 5 under the normal scanning mode to control the timer 4 to calculate a normal scanning time needed for the oscillating waveform to reach a normal oscillating number p1, and the controller 5 also converts the normal scanning time into an L-digit M-bit count value to be stored, wherein M/2≤L≤M, and M≥8.

In addition, in the present embodiment, the normal oscillating number p1 is 1000 for example, the scanning time reference value is 2000 μs for example, and an effective touch is determined when the scanning time is higher than 106% of the scanning time reference value, i.e. 2000× 106%=2120. Moreover, in the present embodiment, the default mode for the controller 5 is the power-saving scanning mode, the controller 5 enters the normal scanning mode when the scanning time is higher than the mode switching threshold value (103% of the scanning time reference value, i.e. 2060), and the controller 5 is switched back to the power-saving scanning mode when the scanning time is lower than 103% of the scanning time reference value, i.e. 2060.

As mentioned above, firstly, step S201 of the power-saving scanning method for the touch device is carried out to use the controller 5 to shorten the normal oscillating number p1 of the counter 3 into a power-saving oscillating number p2, wherein p2=p1/2$^n$, n is an integer, and n≥1. In the present embodiment, as n=1, the power-saving oscillating number p2 is 500.

Then, step S202 is carried out to use the timer 4 to calculate the time needed for the oscillating number of the oscillating waveform generated by the waveform generation module 2 to reach the power-saving oscillating number p2 so as to access a power-saving scanning time. In the present embodiment, the timer 4 calculates the time needed for the oscillating number of the oscillating waveform counted by the counter 3 to reach 500 so as to access the power-saving scanning time, which is 1050 μs in the present embodiment for example.

Afterward, step S203 is carried out to use the controller to convert the power-saving scanning time into an (L-n)-digit M-bit count value, shift the (L-n)-digit M-bit count value to the higher digit by n digits, and pads the lower digits with n zeros to form another L-digit M-bit count value so as to generate an M-bit scanning time simulation value, wherein n≤M/4. In the present embodiment, the power-saving scanning time of 1050 μs is converted into an (L-n)-digit M-bit count value of 0000 0100 0001 1010, wherein the (L-n)-digit value is a 11-digit value. The L-digit M-bit count value generated by padding the lower digits with n zeros is 0000 1000 0011 0100, and thus the M-bit scanning time simulation value is 2100.

Afterward, step S204 is carried out to use the controller 5 to determine whether the M-bit scanning time simulation value is lower than a mode switching threshold value or not. In the present embodiment, the mode switching threshold value is 2060, and thus the M-bit scanning time simulation value, i.e. 2100, is higher than the mode switching threshold value, i.e. 2060.

Finally, step S205 is carried out to switch the touch device 100 into the normal scanning mode when the M-bit scanning time simulation value is higher than the mode switching threshold value. In the present embodiment, because the M-bit scanning time simulation value, i.e. 2100, is higher than the mode switching threshold value, i.e. 2060, the touch device 100 is switched to the normal scanning mode.

In sum, in compared with the conventional technology, which reduces power consumption by extending scanning period has the drawback of lower touch sensitivity, the present invention reduces power consumption by reducing the scanning time or the oscillating number, and uses the method of padding lower digits with zeros after the scanning time or the oscillating number is converted into the bit value to generate the scanning time or the oscillating number similar to that in the normal scanning mode. Thereby, not only the power consumption can be effectively reduced, the touch sensitivity can also be kept.

While the present invention has been particularly shown and described with reference to a preferred embodiment, it will be understood by those skilled in the art that various changes in form and detail may be without departing from the spirit and scope of the present invention.

What is claimed is:

1. A power-saving scanning method for a touch device, adapted when the touch device is switched from a normal scanning mode to a power-saving scanning mode, wherein the touch device includes a touch module, a waveform generation module, a counter, a timer, and a controller, the waveform generation module is utilized for detecting the touch module to generate an oscillating waveform, the counter counts an oscillating number of the oscillating waveform within a normal scanning time $t1$ under the normal scanning mode to access a normal oscillating number, the controller converts the normal oscillating number into an L-digit M-bit count value to be stored, wherein $M/2 \leq L \leq M$ and $M \geq 8$, and the power-saving scanning method comprising:
    (a) using the controller to shorten the normal scanning time $t1$ to a power-saving scanning time $t2$, wherein $t2=t1/2^n$, n is an integer, and $n \geq 1$;
    (b) using the counter to calculate the oscillating number of the oscillating waveform within the power-saving scanning time $t2$ to access a power-saving oscillating number; and
    (c) using the controller to convert the power-saving oscillating number into an (L-n)-digit M-bit count value, shift the (L-n)-digit M-bit count value toward a higher digit by n digits, and pad lower digits thereof with n zeros to form another L-digit M-bit count value for generating an M-bit oscillating number simulation value, wherein $n \leq M/4$.

2. The power-saving scanning method of claim 1, before the step (a) further comprising a step (a1) of using the controller to preset an oscillating number reference value, wherein 97% of the oscillating number reference value is a mode switching threshold value.

3. The power-saving scanning method of claim 2, after the step (c) further comprising a step (d) of using the controller to determine whether the M-bit oscillating number simulation value is lower than the mode switching threshold value, and to switch the touch device to the normal scanning mode when the M-bit oscillating number simulation value is lower than the mode switching threshold value.

4. The power-saving scanning method of claim 1, wherein the waveform generation module is a relaxation oscillator.

5. A power-saving scanning method for a touch device, adapted when the touch device is switched from a normal scanning mode to a power-saving scanning mode, wherein the touch device includes a touch module, a waveform generation module, a counter, a timer, and a controller, the waveform generation module is utilized for detecting the touch module to generate an oscillating waveform, the timer calculates a normal scanning time needed for the oscillating waveform reaching a normal oscillating number $p1$ under the normal scanning mode, the controller converts the normal scanning time into an L-digit M-bit count value to be stored, wherein $M/2 \leq L \leq M$ and $M \geq 8$, and the power-saving scanning method comprising:
    (a) using the controller to shorten the normal oscillating number $p1$ of the counter to a power-saving oscillating number $p2$, wherein $p2=p1/2^n$, n is an integer, and $n \geq 1$;
    (b) using the timer to calculate the time needed for the oscillating waveform generated by the waveform generation module to reach the power-saving oscillating number $p2$ to access a power-saving scanning time; and
    (c) using the controller to convert the power-saving scanning time into an (L-n)-digit M-bit count value, shift the (L-n)-digit M-bit count value toward higher digit by n digits, and pad lower digits thereof with n zeros to form another L-digit M-bit count value for generating an M-bit scanning time simulation value, wherein $n \leq M/4$.

6. The power-saving scanning method of claim 5, before the step (a) further comprising a step (a1) of using the controller to preset a scanning time reference value, wherein 103% of the scanning time reference value is a mode switching threshold value.

7. The power-saving scanning method of claim 6, after the step (c) further comprising a step (d) of using the controller to determine whether the M-bit scanning time simulation value is higher than the mode switching threshold value, and switch the touch device to the normal scanning mode when the M-bit scanning time simulation value is higher than the mode switching threshold value.

8. The power-saving scanning method of claim 5, wherein the waveform generation module is a relaxation oscillator.

\* \* \* \* \*